INVENTOR.
Russell J. Pusztay
BY
Elmer L. Zwickel
Attÿ.

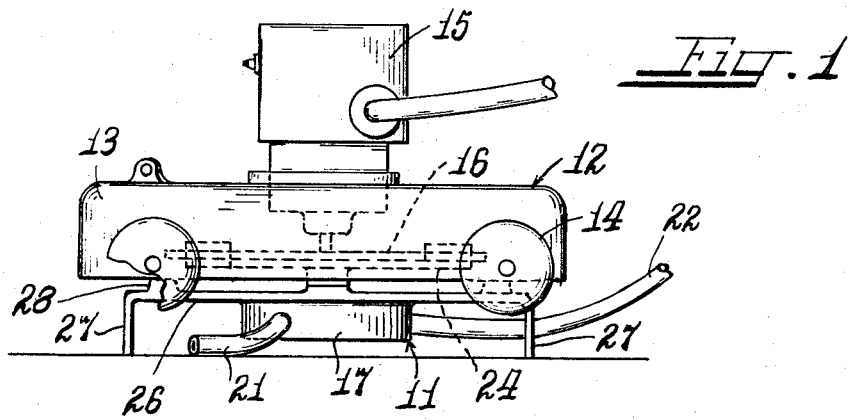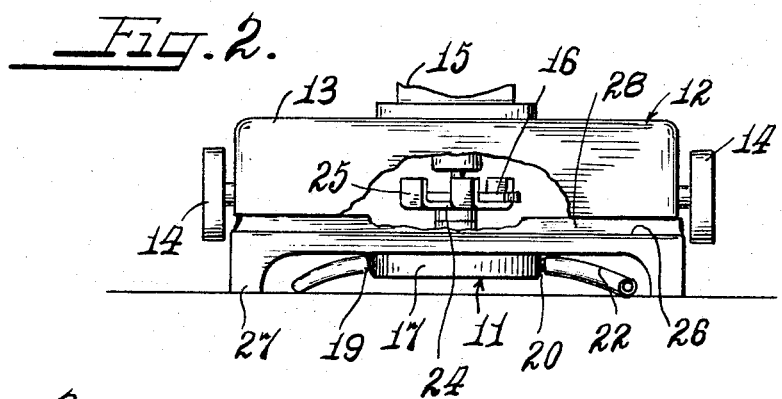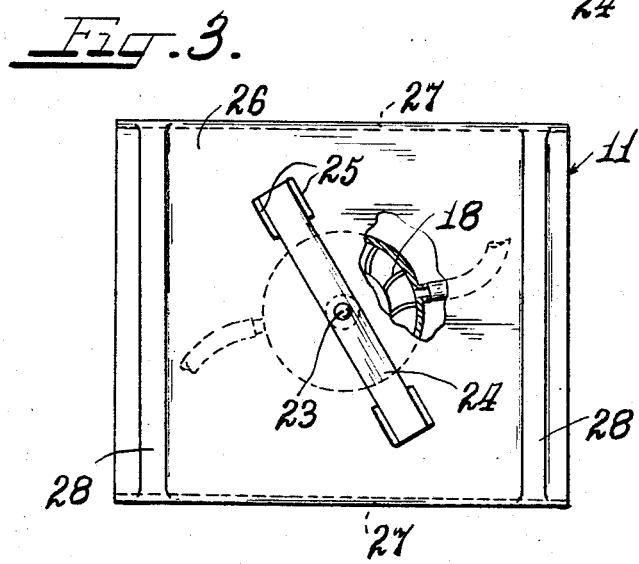

United States Patent Office 3,402,668
Patented Sept. 24, 1968

3,402,668
COMBINATION SUMP PUMP AND MOWER
Russell J. Pusztay, 15210 Oak St., Dolton, Ill. 60419
Filed Nov. 8, 1966, Ser. No. 592,892
4 Claims. (Cl. 103—87)

ABSTRACT OF THE DISCLOSURE

An attachment for a rotary type lawn mower comprised of a frame upon which the mower is seated and carrying on its under side a water pump having its driven shaft extending up through the frame and mounting an element having detachable connection with the mower cutter blade.

---

This invention relates to improvements in sump pumps and is particularly concerned with a sump pump having drive means adapted to be operably engageable by a power driven component such as a domestic rotary or reel type lawn mower having an internal combustion engine power source.

The sump pump assembly of the present invention is intended as a portable installation in flooded areas such as a basement of a building, particularly one having overhead sewers. During conditions of flooding, electric current in the building is frequently cut off with the consequent inoperation of any electrically driven sump pump which may be provided in the area. The instant pump unit is self contained and, in one embodiment herein disclosed, it includes a pump driving shaft mounting, outside the housing, an elongated fixture of such character that when a rotary lawn mower is nested thereover, the cutting blade of the mower is engaged with the fixture so as to afford direct drive means for the pump shaft. In another embodiment, the pump unit is designed to be operably associated with a self-propelled reel type lawn mower so as to be driven thereby.

An object of the invention is to provide a novel sump pump-power source assembly.

Another object is to provide a combination sump pump and power mower drive assembly.

Another object of the invention is to provide a novel sump pump with novel drive connections.

Another object is to provide a novel sump pump drive assembly that is not expensive to manufacture or assemble, and one that is simple to use and efficient in use.

The structure by means of which the above noted and other objects and advantages of the invention are attained will be described in the following specification, taken in conjunction with the accompanying drawings, showing preferred illustrative embodiments of the invention, in which:

FIG. 1 is a side elevational view of a representative sump pump and rotary type power mower assembly.

FIG. 2 is an end elevational view of the assembly with parts broken away to illustrate the drive connection.

FIG. 3 is a top plan view of the sump pump, partly broken away.

Figure 4:
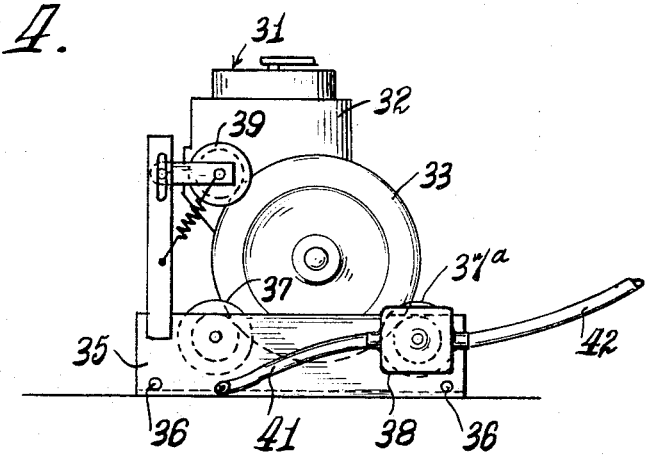
FIG. 4 is a side elevational view of a sump pump assembly having a reel type power mower connected therewith.

Referring to the exemplary disclosure of the invention shown in FIGS. 1–3 of the accompanying drawings, the assembly comprises a sump pump generally indicated at 11 and a conventional type of domestic rotary lawn mower 12 having an internal combustion engine as its power source. More particularly, such a lawn mower includes a housing 13 mounted on support wheels 14 and having an internal combustion engine 15 for driving its rotary cutting blade 16.

The sump pump comprises a pump housing 17 containing a rotary pump element 18 and having a flow inlet 19 and an outlet 20. Suitable flexible conduits 21–22 may be connected to said inlet and outlet respectively. The pump shaft 23 projects out of the top wall of housing 17 and carries firmly on its upper end a connector or strap 24 preferably formed on its margins with ears 25. The pump housing includes a deck frame or wall 26 having at least opposed margins turned downwardly to provide support flanges or legs 27.

In use, the lawn mower 12 is seated on top of the pump housing frame 26, as shown, with its rotary cutting blade 16 nested between the ears 25 on strap 24. The frame 26 is of less width than the spacing between the mower support wheels 14 so that the housing seats firmly on ribs 28 on the frame with its wheels elevated off of the floor of the area.

When the internal combustion engine is operated to rotate the cutting blade 16, said blade, having a drive connection with strap 24, will cause said strap to rotate therewith and thus drive the pump element to thereby draw water through inlet conduit 21 and discharge it outside the area through conduit 22. If the assembly is arranged in a basement or other enclosed area, an exhaust conduit 29 may be provided for the exhaust of combustion fumes from the area.

Figure 5:
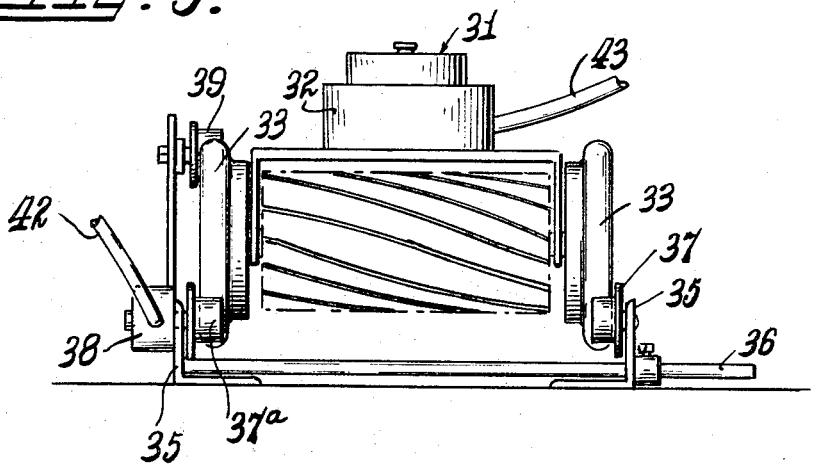
FIG. 5 is an end elevational view of the FIG. 4 assembly.

In the FIGS. 4 and 5 illustration, representative of a self propelled reel type power mower drive source, the mower, generally indicated at 31, includes an internal combustion engine 32 and a pair of support drive wheels 33 having a reel type cutter 34 secured on the wheel shaft and extending between said wheels.

The pump assembly includes a support frame comprised of a pair of laterally spaced apart base angles 35 adjustable toward and away from each other, as along guide rods 36, so as to vary the effective width thereof to accommodate mowers of different widths. Each base angle 35 mounts a pair of idler rollers 37, which preferably are flanged so as to receive seated thereon the respective drive wheels 33 of the mower when the latter is seated thereon as shown. One of the idler rollers, for example roller 37a, is keyed or otherwise connected to the drive shaft of a rotary pump 38, the housing of which is carried firmly on one of the base angles 35. A spring loaded idler 39 is arranged to bear down on the drive wheel 33 engaged with roller 37a to insure a drive connection between the said drive wheel and roller 37a.

When the motor is operated to rotate the drive wheels 33, said wheels ride upon the idler rollers 37 and the frictional bearing maintained between the one wheel 33 and roller 37a becomes effective to drive the pump. The pump is of course fitted with a water inlet line 41 and a water discharge line 42 and, if necessary, a combustion gas exhaust conduit 43 may be connected to the engine exhaust.

Although I have described preferred embodiments of my invention, in considerable detail, it will be understood that the description thereof is intended to be illustrative, rather than restrictive, as many details of the structures may be modified or changed without departing from the spirit or scope of the invention. Accordingly, I do not desire to be restricted to the exact construction described.

I claim:

1. A water pump attachment for a lawn mower of the type having a housing and a driven axle carrying a cutter blade, said attachment including a horizontal wall having depending legs supporting said wall spaced from a support surface, a water pump secured firmly to the under surface of said wall and having a fluid inlet and outlet, a pump shaft extending upwardly from the pump through said wall, and a connector element on the upper end of said shaft detachably engaged by the cutter blade when the mower is seated on said wall.

2. The structure recited in claim 1, in which means is provided to retain the lawn mower seated firmly on said wall.

3. The structure recited in claim 1, in which the connector element comprises radially opposed arms secured firmly on said shaft.

4. The structure recited in claim 1, in which the mower housing is seated on said wall.

References Cited

UNITED STATES PATENTS

| | | | |
|---|---|---|---|
| 615,802 | 12/1898 | Butler | 230—248 |
| 2,574,177 | 11/1951 | Godet | 230—215 XR |
| 2,684,635 | 7/1954 | Winkelman et al. | 103—87 XR |
| 3,151,563 | 10/1964 | Lita et al. | 103—54 |

ROBERT M. WALKER, *Primary Examiner.*